United States Patent
Mizuma et al.

[11] Patent Number: 5,910,952
[45] Date of Patent: Jun. 8, 1999

[54] CALL RESTRICTION SYSTEM FOR AN ATM EXCHANGE

[75] Inventors: Keiji Mizuma; Izumi Kobayashi, both of Kawasaki, Japan

[73] Assignee: Fujitsu Limited, Kanagawa, Japan

[21] Appl. No.: 08/701,490

[22] Filed: Aug. 22, 1996

[30]   Foreign Application Priority Data

Aug. 22, 1995   [JP]   Japan .................................. 7-213122

[51] Int. Cl.[6] .................................................. H04L 12/56
[52] U.S. Cl. ......................... 370/395; 370/230; 370/235
[58] Field of Search ................................... 370/229, 230, 370/231, 235, 236, 237, 392, 395; 379/93.02, 196, 197, 200, 188, 93.04, 93.05

[56]    References Cited

U.S. PATENT DOCUMENTS

| | | | |
|---|---|---|---|
| 5,040,171 | 8/1991 | Osaki | 370/232 |
| 5,070,498 | 12/1991 | Kakuma et al. | 370/233 |
| 5,341,373 | 8/1994 | Ishibashi et al. | 370/440 |
| 5,515,359 | 5/1996 | Zheng | 370/232 |
| 5,521,905 | 5/1996 | Oda et al. | 370/232 |
| 5,675,574 | 10/1997 | Norizuki et al. | 370/230 |

FOREIGN PATENT DOCUMENTS 446432   2/1992   Japan .

*Primary Examiner*—Chau Nguyen
*Assistant Examiner*—Soon-Dong Hyun
*Attorney, Agent, or Firm*—Helfgott & Karas, P.C.

[57]    ABSTRACT

A call restriction system for an ATM exchange reduces the load on the call control processor and achieves a step-wise variation in the degree of call restriction in response to the degree of load in an ATM exchange. The exchange has at least one circuit interface section to which are connected a plurality of physical circuits The exchange terminates the physical circuits and a call control processor which is connected to the circuit interface section or sections and performs call-processing control. A signal control processing unit within the circuit interface section performs call restriction with respect to each individual physical circuit, either in response to an instruction from the call control processor or independently.

8 Claims, 18 Drawing Sheets

(UNITS: %)

|  |  | SUBSCRIBER PRIORITY ($i$) | | | | |
|---|---|---|---|---|---|---|
|  |  | 0 | 1 | 2 | 3 | 4 |
| RESTRICTION LEVEL ($j$) | 0 | 50 | 0 | 0 | 0 | 0 |
|  | 1 | 100 | 50 | 0 | 0 | 0 |
|  | 2 | 100 | 100 | 50 | 0 | 0 |
|  | 3 | 100 | 100 | 100 | 50 | 0 |
|  | 4 | 100 | 100 | 100 | 100 | 50 |

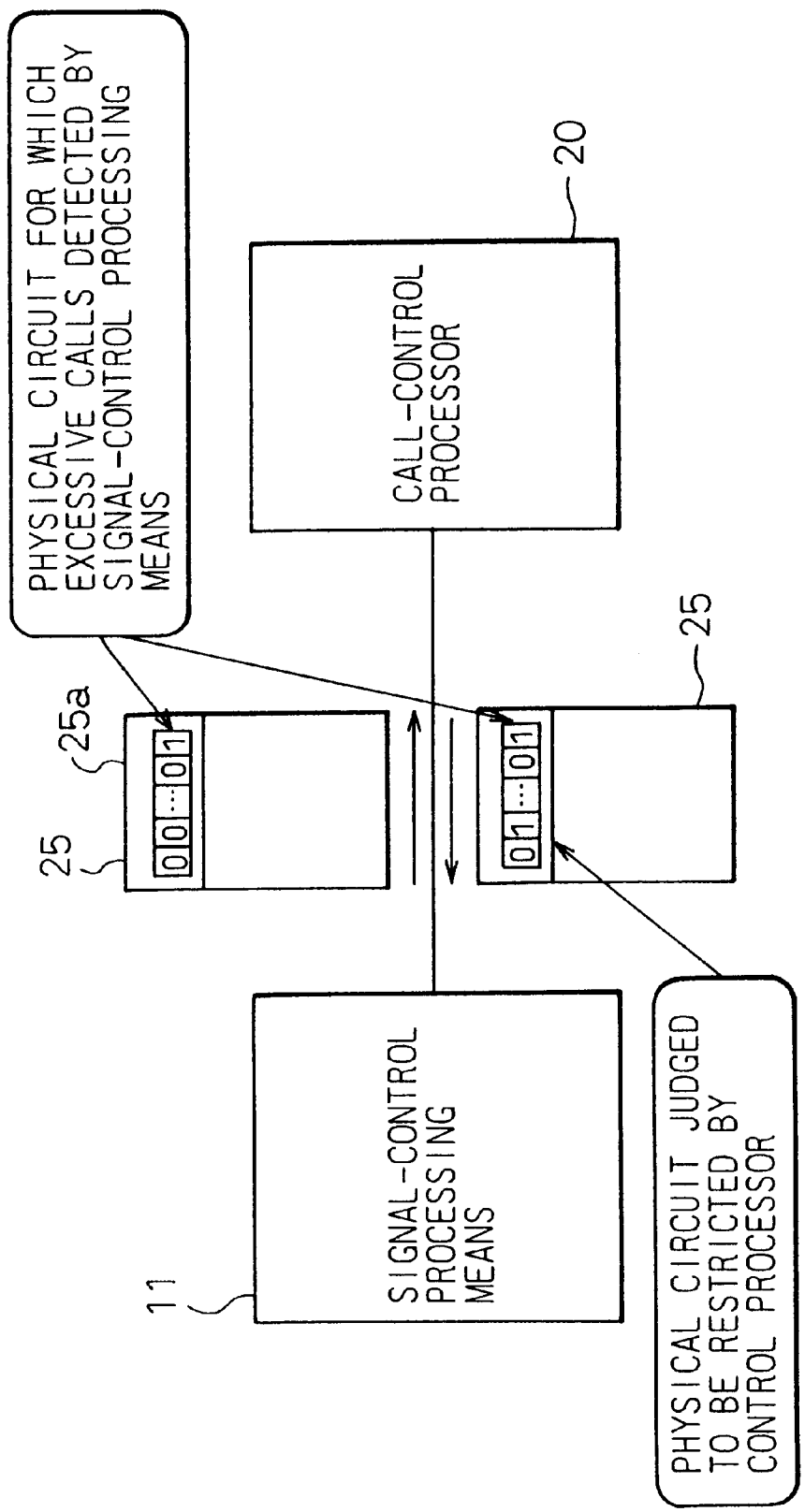

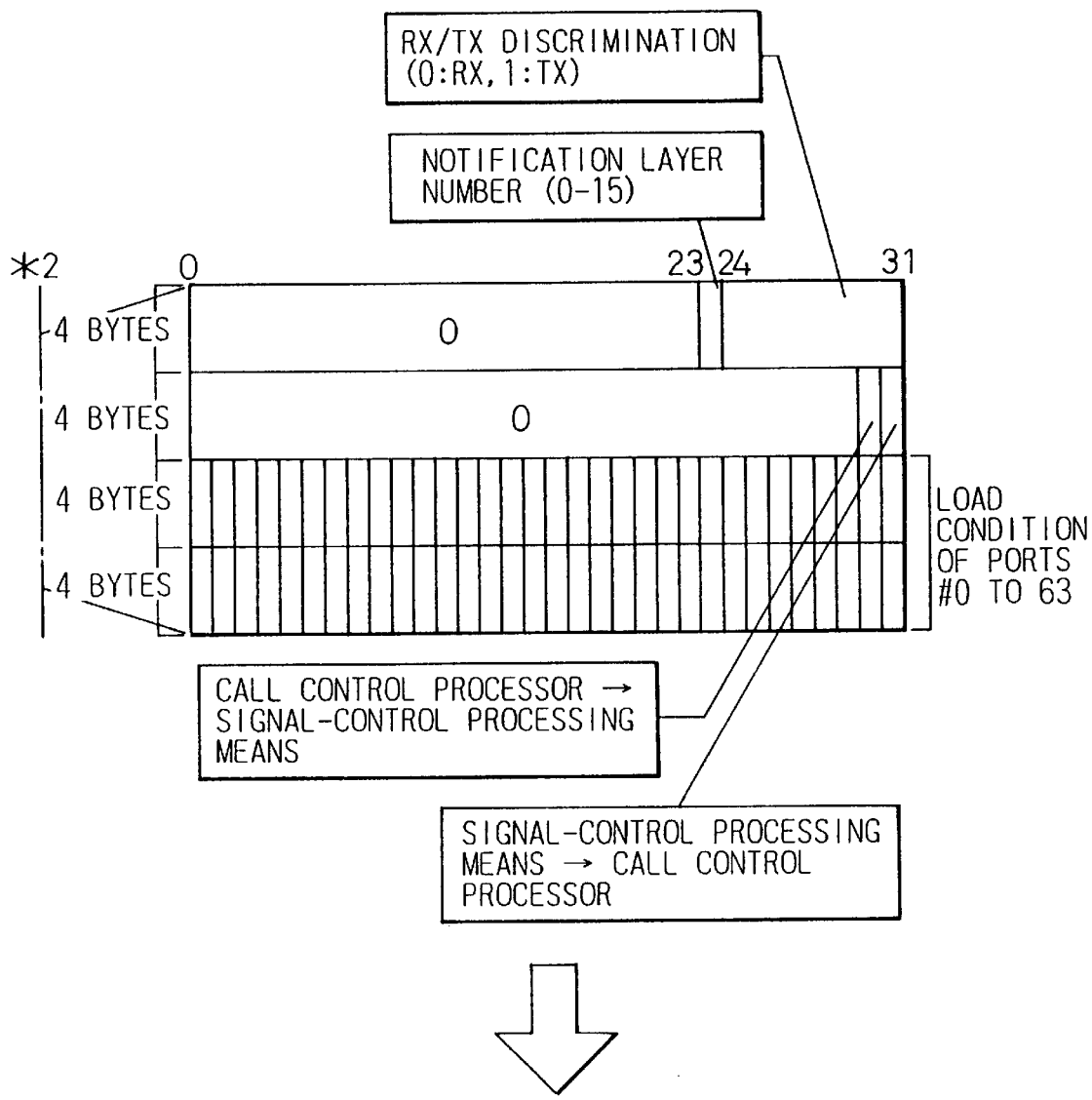

CALL RESTRICTION SYSTEM FOR AN ATM EXCHANGE

BACKGROUND OF THE INVENTION

1. Field of the Invention

The present invention relates to a call restriction system for an ATM exchange.

An ATM (asynchronous transmission mode) exchange system which provides services using ATM as recommended by the ITU-T (formerly the CCITT) has been proposed as implementation of a broadband ISDN (integrated service digital network) which is seen as the infrastructure for the next-generation of data communication systems.

2. Description of Related Art

In an ATM exchange, data to be communicated, at speeds ranging from several tens of bps to several hundred Mbps, is all divided in to packets (cells) of a fixed length of 0 to approximately 128 octets, these being then mixed on a transmission path of 150 Mbps or greater, with high-speed processing being performed by high-speed packet switching.

In previous non-ATM exchanges, call restriction processing was either performed by means of software in the exchange control processor or was performed overall for all circuits which are under the control of the firmware which controls a circuit interface section.

Call restriction is performed as a means of preventing an increase in load when the exchange becomes overloaded, and in a system in which call restriction is performed by the control processor of an exchange, the call restriction itself causes an increase in the load on the exchange's control processor, thereby itself leading to a increase in the load on the exchange.

In an exchange which has firmware in a circuit interface section which controls the circuit interface, it is this firmware which performs call restriction. A switching system comprises a circuit interface section, a call control processor, and call-processing software, with a plurality of physical circuits connected to the above-noted circuit interface section. These physical circuits are connected either to subscribers or to other relay equipment.

Within the above-noted circuit interface section is provided control firmware for the purpose of performing call restriction processing, and when data for the purpose of call restriction is received by the call-processing software, a call restriction program is started up, in accordance with the call-processing software. In the case in which it has become necessary to perform call restriction, a call restriction request is made to the circuit interface section, in response to the receipt of which the circuit interface section control firmware performs call restriction with respect to all the physical circuits that are connected to its own circuit interface section.

In this system, because part of the load of the call control processor is shifted to the control firmware, there is a reduction in the processing load on the call control processor. However, when performing restriction processing by control firmware, because restriction is performed for all physical circuits connected to the local circuit interface, there is the problem of excessive restriction.

In an ATM exchange, so-called call restriction or incoming/outgoing restriction in the past was not performed, there being only originating call restriction by means of, for example, a command issued by a maintenance personnel in the station-to-station interface. The physical circuits in an ATM exchange are large-capacity circuits which terminate ATM cells, which exist as virtual paths (VPs) and virtual channels (VCs), and at present rather than subscriber terminals being directly connected to these physical circuits, frame relays and packet exchanges are connected, with a plurality of subscriber terminals which are mapped onto the above-noted physical channels being connected via an LAN gateway or the like. If call restriction or incoming/outgoing restriction is to be performed in an ATM exchange as well, and if restriction is performed for each individual circuit (logical circuit) as in the past, while it is possible to expect a reduction in call loss, this would result in a significant increase in the associated processing load.

SUMMARY OF THE INVENTION

In consideration of the above-noted drawbacks in the prior art, an object of the present invention is to provide a call restriction system for an ATM exchange which is capable of reducing the load on the call control processor, and of step-wise reducing the degree of call restriction in response to the degree of load.

In accordance with the present invention, in an ATM exchange which has at least one circuit interface section to which are connected a plurality of physical circuits and which terminates the circuits, and a call control processor which is connected to the circuit interface section or sections and which performs call-processing control, a call restriction system is provided within the above-noted circuit interface section, having a signal-control processing means which performs call restriction either by means of an instruction from the above-noted call-processing controller or independently. The above-noted signal-control processing means performs call restriction with respect to individual physical circuits of the plurality of physical circuits which are connected to the circuit interface section.

In accordance with the present invention, the above-noted signal-control processor which receives a Setup message or an Add Party message from a subscriber establishes, by a prescribed algorithm, whether or not call restriction is to be performed with respect to a physical circuit that encompasses the virtual circuit which generated this message, and if the judgment made is that of "restricted call," an instruction is issued so that a Release Complete message is returned to the corresponding signal-control processing means, after which a call restriction request is issued to the same signal-control processing means. The above-noted prescribed algorithm is performed for each call, in accordance with a restricted call count ratio, which is established by the call restriction level, which varies in accordance with the load condition of the exchange and by the call processing priority which is set for the above-noted physical circuit.

In addition, according to the present invention, if a signal-processing control means which has received a call restriction request from the above-noted call control processor receives either a Setup message or an Add Party message within a prescribed period of time after it receives the above-noted call restriction request, it independently performs call restriction processing with respect to the corresponding physical circuit. If the above-noted signal-control processing means receives a Setup message or an Add Party message, it checks whether or not the corresponding physical circuit is currently subject to restriction, and if it is currently not subject to restriction the corresponding message is sent to the call control processor. However, if it is currently subject to restriction, the corresponding message is abandoned, and the number of abandonments is recorded.

If the above-noted signal-control processing means receives a call restriction request from the call control processor, simultaneously with setting the restriction level of the corresponding physical circuit, it sets the restriction time period timer, and if this timer times out, a comparison is made between the number of abandoned calls and the threshold value provided for each of the restriction levels, incrementing the restriction level by one if the number of abandoned calls exceeds the threshold level, decrementing the restriction level by one if the threshold level is not exceeded and resetting the restriction time period timer. The above-noted signal-control processing means returns to the normal condition when the restriction level becomes zero.

In addition, when the above-noted signal-control processing means receives either a Setup message or an Add Party message and abandons that message, an identification code which indicates that the exchange is overloaded is appended to a Release Complete, which is sent to the corresponding subscriber.

BRIEF DESCRIPTION OF THE DRAWINGS

The present invention will be more clearly understood from the description as set forth below, with reference being made to the accompanying drawings, wherein:

FIG. 13 is a drawing which shows the transfer of communication messages between a signal-control processing means and a call control processor;

FIGS. 14A to 14C are drawings which shows an example of the communication message format of FIG. 13;

DESCRIPTION OF PREFERRED EMBODIMENTS

Figure 1:
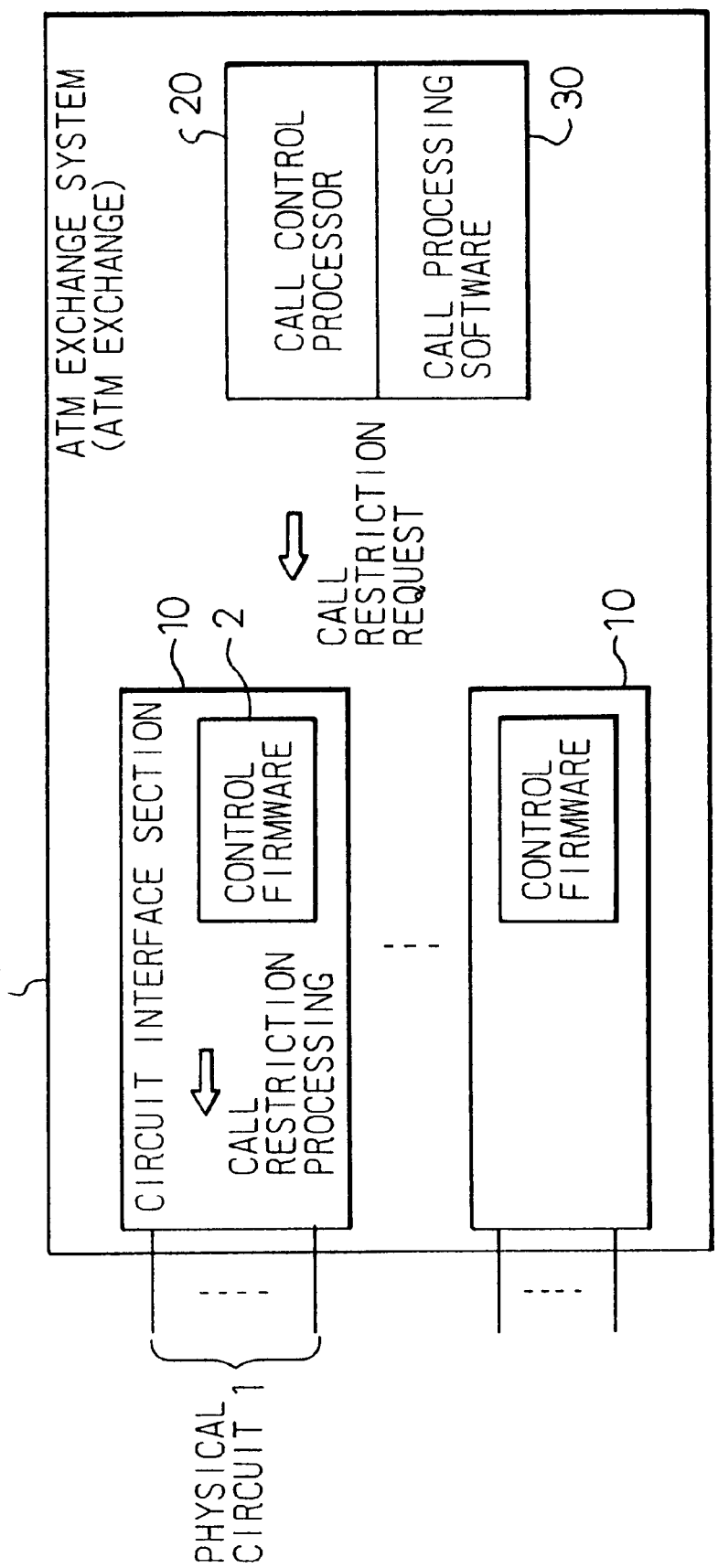
FIG. 1 is a conceptual view of an ATM exchange system in the past.

Before describing the present invention itself, an explanation will be provided of an ATM exchange system of the prior art, with reference being made to FIG. 1.

In FIG. 1, the reference numeral 100 denotes an ATM exchange system (ATM exchange), this comprising a circuit interface section 10, a call control processor 20, and call processing software 30. The circuit interface section 10 has connected to it a plurality of physical circuits 1. Each of the physical circuits 1 is connected to either a subscriber or a relay apparatus.

Within the circuit interface section 10 is provided control firmware 2, for the purpose of performing call restriction processing. In a system configured in this manner, when the call control processor 20 receives data for the purpose of call restriction, a call restriction program is started up, in accordance with the call-processing software 30. If it has become necessary to perform call restriction, a call restriction request is made to the circuit interface section 10. The firmware 2 of the circuit interface section 10 which receives this call restriction request performs call restriction with respect to all the physical circuits 1 which are connected to its circuit interface section.

Figure 2:
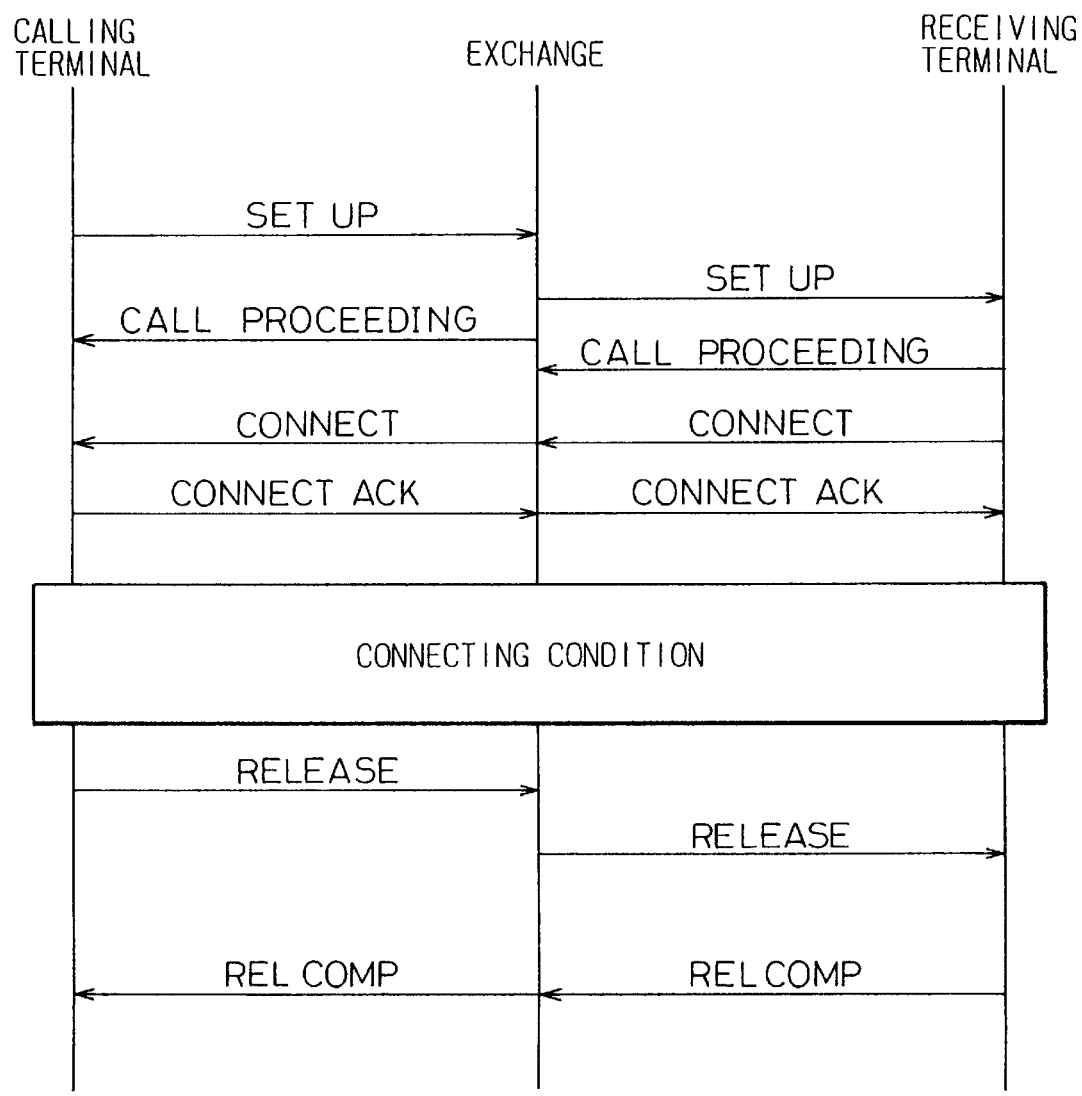
FIG. 2 is a drawing which shows a general communication means between a terminal an exchange when a call is made.

FIG. 2 shows the general communication protocol between a terminal and an exchange when a call is made. The calling terminal sends a Setup message to the ATM exchange 100 via a physical circuit 1. The exchange 100 sends a Setup message to the receiving terminal via the physical circuit 1 for the purpose of receiving the call. When a Connect message is returned from the receiving terminal, indicated it has accepted the call, a path connection is made at the exchange 100 to connect the two terminals. Thereafter, the connection is maintained, after which the call is terminated if a Release message is sent by either party.

Figure 3:
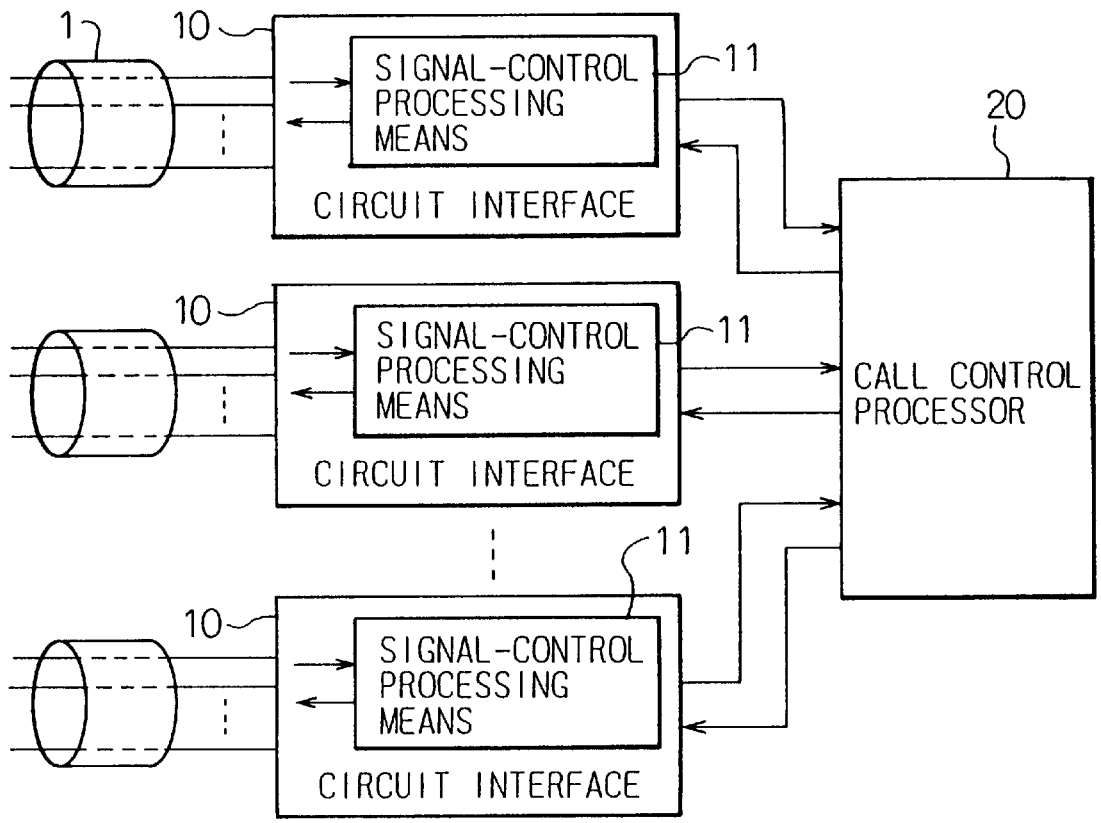
FIG. 3 is a block diagram showing the principle of the present invention.

Turning to FIG. 3, which is a block diagram illustrating the principle of the present invention, elements which are the same as shown in FIG. 1 have been assigned the same reference numerals. In this drawing, the reference numeral 10 denotes at least one circuit interface section to which a plurality of physical circuits are connected and performs circuit termination, and 20 is a call control processor which is connected to the circuit interface section or sections 10 and which performs call-processing control. This circuit interface section or section 10 and the call control processor 20 form the essential part of an ATM exchange. Within the circuit interface section 10, the reference numeral 11 denotes a signal-control processing means which performs restriction, either in response to an instruction from the above-noted call control processor 20, or independently. This signal-control processing means 11 is implemented by either firmware or hardware, for example.

Figure 4:
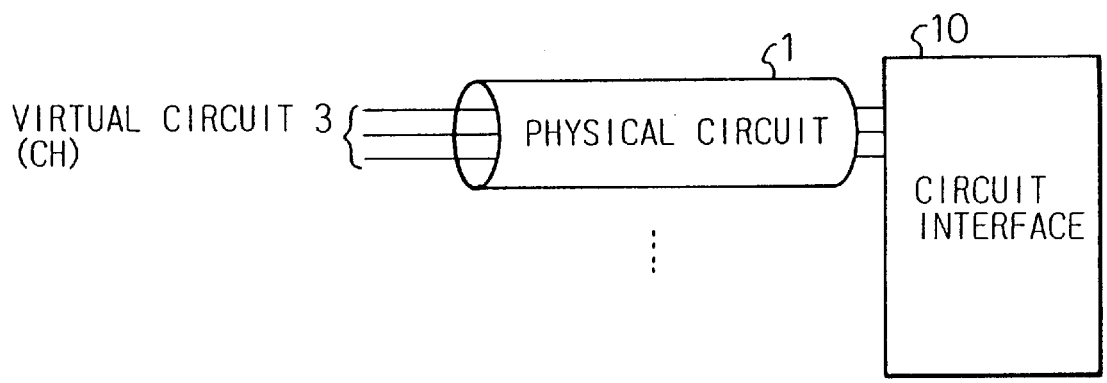
FIG. 4 is a drawing which shows the relationship between a physical circuit and a virtual circuit.

FIG. 4 is a drawing which shows the relationship between a physical circuit and a virtual circuit. The physical circuit 1 in this drawing represents one physical communication circuit, within which time-division multiplexing is done to perform transfer of a plurality of channels. If these channels (CH) are represented in parallel, the physical circuit 1 is equivalent to being made up of virtual circuits which correspond to these channels. In reality, the circuit interface section 10 has a plurality of physical circuits 1 as shown in the drawing.

In the configuration noted above, when the signal-control processing means 11 within the circuit interface section 10 receives a call restriction request from the call control processor 20, in response to this request or independently, it performs call restriction with respect to the physical circuit 1, thereby reducing the load on the call control processor 20 and enabling a step-wise variation of the degree of restriction in accordance with the degree of load. In this case, the above-noted signal-control processing means 11 performs call restriction corresponding to each physical circuit, that is, for each of the plurality of physical circuits 1 which is connected to the circuit interface section 10.

In accordance with the present invention, the excessive performance of restriction is eliminated. Additionally, an above-noted call control processor 20 which receives either a Setup message or an Add Party message from a subscriber makes a judgment as to whether or not to perform call restriction with respect to the physical circuit 1 which encompasses the virtual circuit which generated the message, and if the judgment made is that of "restricted call," an instruction is issued so that a Release Complete message is returned to the corresponding signal-control processing means, after which a call restriction request is issued to the same signal-control processing means 11.

In accordance with the configuration of the present invention, it is possible to perform call restriction with respect to each individual physical circuit.

The above-noted prescribed algorithm is performed for each call, in accordance with a restricted number of calls ratio, which is established by the call restriction level, which varies in accordance with the load condition on of the exchange and by the call processing priority which is set for the above-noted physical circuit.

According to the configuration of the present invention, it is possible to optimally establish whether or not to perform call restriction for each individual call, according to the call restriction level and restricted number of calls ratio.

An additional feature of the present invention is that if a signal-control processing means 11 which receives call restriction request from the above-noted call control processor 20 receives either a Setup message or an Add Party message within a prescribed period of time after it receives the above-noted call restriction request, it independently performs call restriction processing with respect to the corresponding physical circuit 1.

According to the configuration of the present invention, because a signal-control processing means 11 which receives a call restriction request from the call control processor 20 performs call restriction independently, it is possible to reduce the load on the call control processor 20.

Another feature is that if the above-noted signal-control processing means receives a Setup message or an Add Party message, it checks whether or not the corresponding physical circuit 1 is currently subject to restriction, and if it is currently not subject to restriction the corresponding message is sent to the call control processor 20. However, if it is currently subject to restriction, the corresponding message is abandoned, and the number of abandonments is recorded.

According to the configuration of the present invention, during call restriction the signal-control processing means 11 abandons the Setup message or Add Party message, thereby enabling independent call restriction.

Yet another feature is that if the above-noted signal-control processing means 11 receives a call restriction request from the call control processor 20, simultaneously with setting the restriction level of the corresponding physical circuit 1, it sets the restriction time period timer, and if this timer times out, a comparison is made between the number of abandoned calls and the threshold value provided for each of the restriction levels, and it increments the restriction level by one if the number of abandoned calls exceeds the threshold level and it decrements the restriction level by one if the threshold level is not exceeded and resets the restriction time period timer.

According to the configuration of the present invention, the signal-control processing means 11 performs a comparison between the number of abandoned calls and a threshold value which is provided for each individual restriction level, increments the restriction level if the number of abandonments exceeds the threshold level, and decrements the restriction level if the threshold level is not exceeded, thereby enabling a step-wise change in the degree of call restriction in response to the degree of load, and enabling the performance of efficient call restriction.

A feature of the above-noted signal-control processing means 11 is that when the restriction level reaches zero it returns to the normal condition.

According to the configuration of the present invention, when there is no longer a need to perform call restriction, it is possible to quickly return to the normal processing condition.

An additional feature of the signal-control processing means 11 is that when it receives a Setup message or an Add Party message and abandons that message, an identification code which indicates that the exchange is overloaded is appended to a Release Complete, which is sent to the corresponding subscriber.

According to the configuration of the present invention, the need for the subscriber to be conscious of the fact that call restriction is being performed, and excessive calling, are eliminated.

Figure 5:
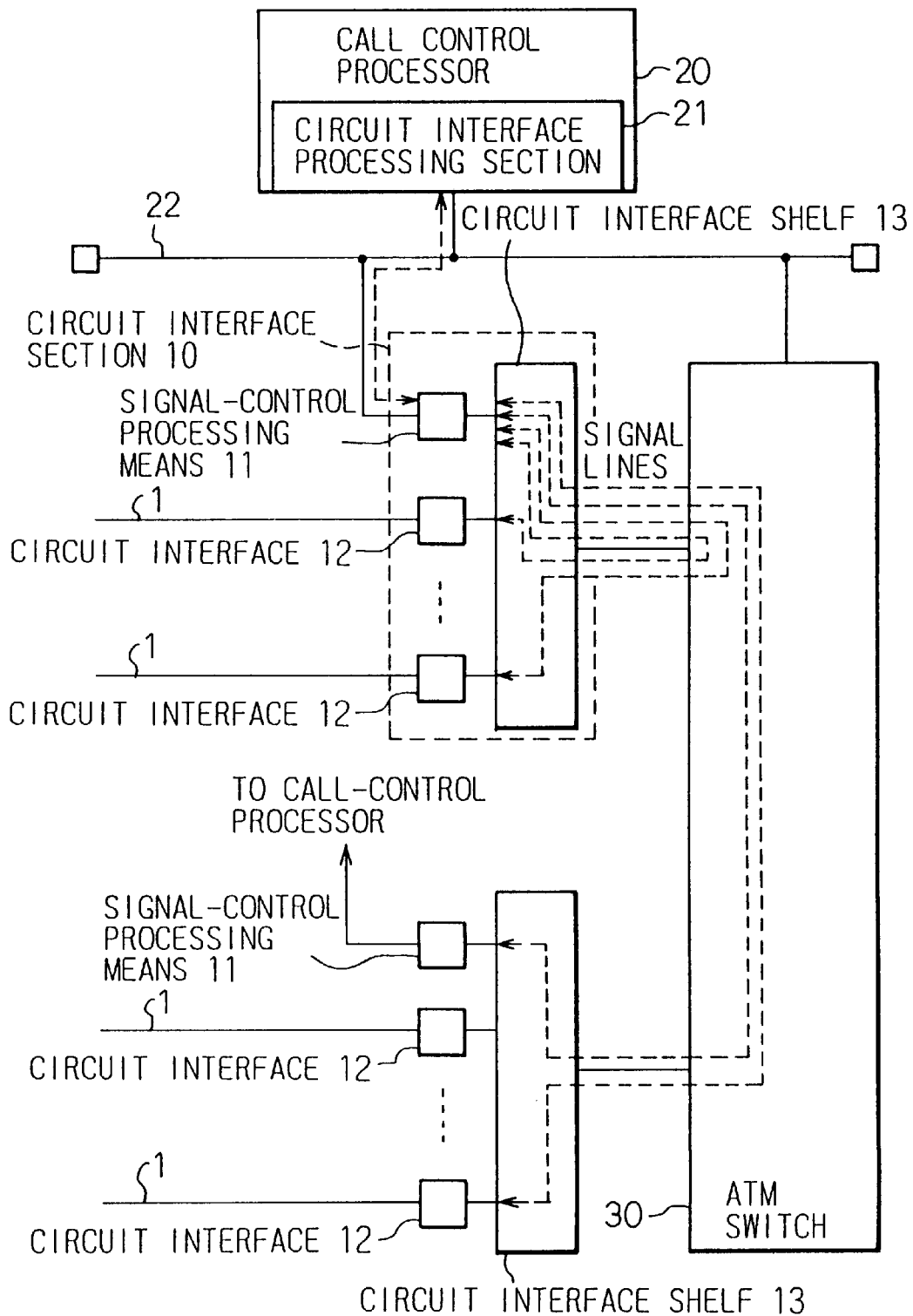
FIG. 5 is a block diagram which shows an example of the overall configuration of the present invention.

FIG. 5 is a block diagram which shows an example of the overall configuration of the present invention. In this drawing, elements that are the same as elements in FIG. 3 have been assigned the same reference numerals as corresponding elements in FIG. 3.

In an ATM exchange, the signal-control processing means 11 which controls the circuit interface section 10 performs transfer of messages between the subscriber terminal and the call control processor. The signal-control processing means 11 comprises a circuit interface section which is provided for each physical circuit, a circuit interface shelf 13 which contains these, and the circuit interface section 10 of FIG. 3.

The circuit interface section 10 and an ATM switch 30 are mutually connected via the circuit interface shelf 13. Signal transfer between the circuit interface section 10 and the call control processor 20 is performed via a circuit interface processing section 21 which is contained within the call-control processor 20 and via the signal-control processing means 11 which is connected to the circuit interface shelf 13. The circuit interface processing section 21 of the call-control processor 20 and the signal-control processing means 11 are connected to a system bus 22, and signal transfer is performed via this system bus 22.

Figure 6:
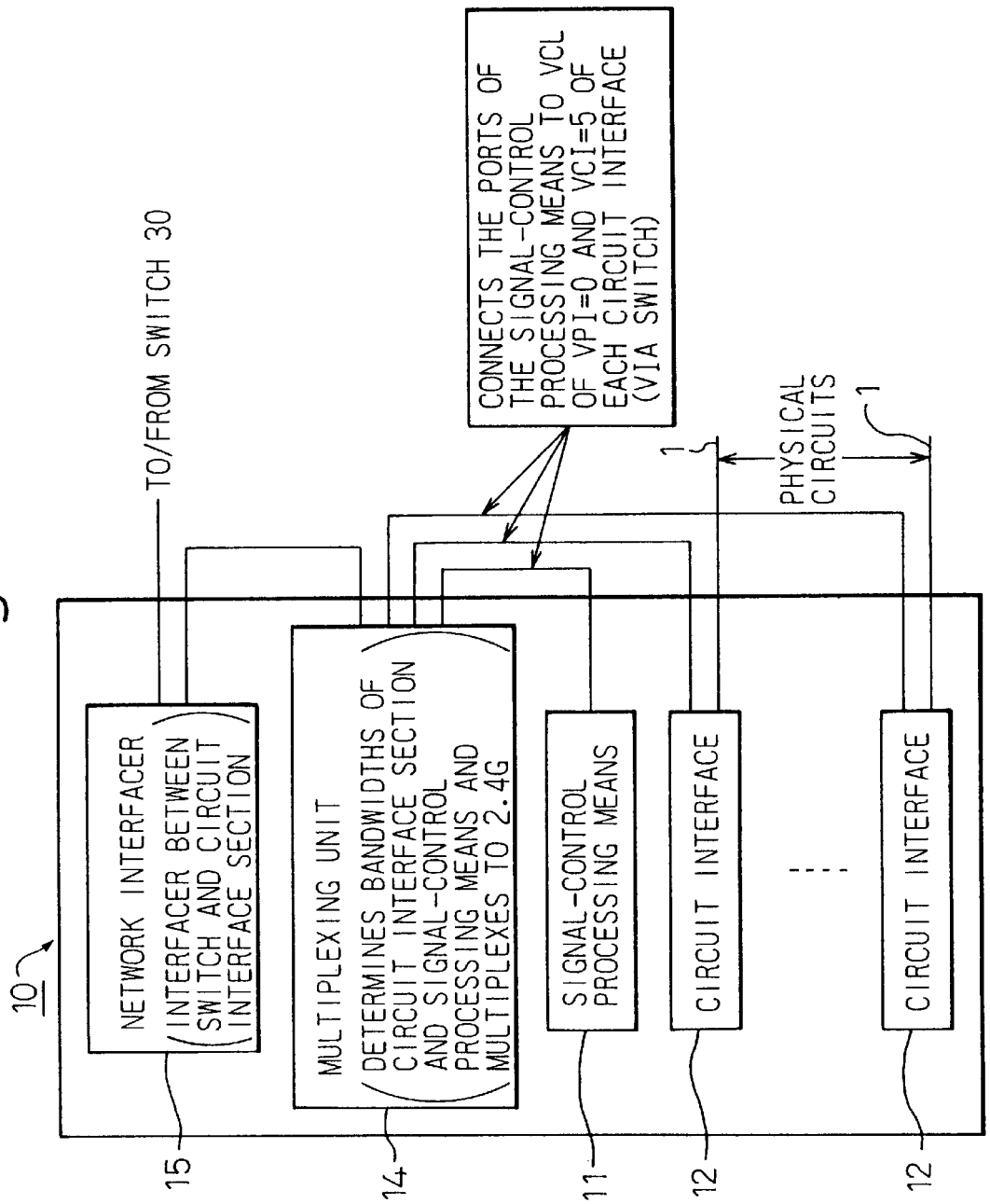
FIG. 6 is a functional block diagram which shows a circuit interface section.

FIG. 6 is a functional block diagram of the circuit interface section.

In FIG. 6, the signal-control processing means 11 and the circuit interface 12 are the same as elements shown in FIG. 6. Call control signals from each physical circuit 1 which are received via the circuit interface 12 are first input to a multiplexing unit 14 within the circuit interface shelf 13 as control channel signals having the prescribed VPI/VCI (0/5 in the example shown in the drawing), and are given to the ATM switch 30 via the network interface apparatus 15. The signals that are switched thereby are given to the signal-control processing means 11 via the network interface apparatus 15 and multiplexing unit 1 within the above-noted circuit interface shelf 13.

The operation of a system configured in this manner can be described as follows.

When either a Setup message (one-to-one calling message) or an Add Party message (one-to-n calling message) is issued from a subscriber terminal (not shown in the drawing) connected to the physical circuit 1, the message is input from the physical circuit 1 to the circuit interface section 10 via the circuit interface 12. The signal-control processing means 11 receives these messages from the circuit interface shelf 13 and makes notification to the call-control processor 20 via the circuit interface processing section 21. The call-control processor 20 performs a judgments of whether or not to perform call restriction with respect to the physical circuit 1 included in the virtual circuit which generated the message, according to a prescribed algorithm (to be described later).

In the case in which the judgment is that it is not necessary to perform call restriction, notification of this condition is made by the call-control processor 20 to the signal-control processing means 11. In this case, the circuit interface section 10 passes the message from the subscriber as is. As a result, the message following the Setup message is sent by the subscriber, this message being interpreted by the call-control processor 20, which controls the ATM switch 30, which establishes a path (communication route) with the other party within the ATM switch 30. As a result, it is possible to perform communication such as a telephone call between the calling subscriber and the receiving subscriber.

If the result of the above-noted judgment is that it is necessary to perform call restriction, the call-control processor 20 makes a call restriction request with respect to the circuit interface section 10. The signal-control processing means 11 of a circuit interface section 10 which receives a call restriction request performs call restriction with respect to only the single corresponding physical circuit 1. That is, according to the present invention, when the signal-control processing means 11 within the circuit interface section 10 receives a call restriction request, in response to the request or independently it performs call restriction with respect to a single physical circuit 1. Therefore, the load on the call-control processor 20 is reduced, and it is possible to perform step-wise variation of the degree of restriction in response to the degree of load.

In addition, the signal-control processing means 11 performs call restriction for each individual physical circuit which is connected to the circuit interface section 10. By doing this, excessive restriction is prevented.

Figure 7:
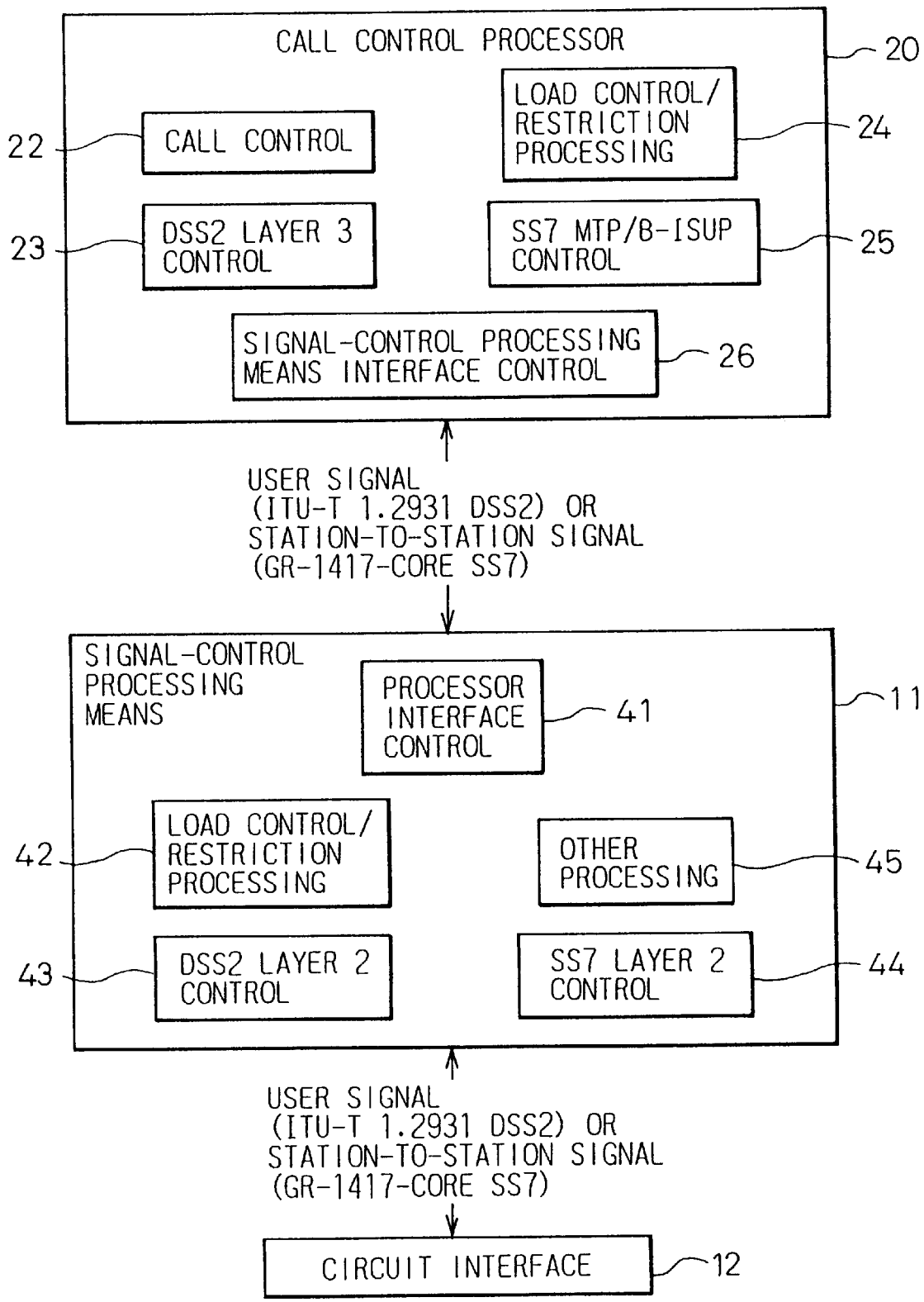
FIG. 7 is a drawing which shows an example of the functional configuration of the present invention.

FIG. 7 is a drawing which shows an example of the functional configuration of the according to the present invention. Elements which are the same as elements in FIG. 5 have been assigned the same reference numerals as corresponding elements in FIG. 5. Between the call-control processor 20 and the signal-control processing means 11 transfer is performed of user signals (ITU-T Q. 2931 DSS2) or station-to-station signals (GR-1417-CORE SS7). Between the signal-control processing means 11 and the circuit interface 12 also, transfer of user signals (ITU-T Q. 2931 DSS2) or station-to-station signals (GR-1417-CORE SS7) is performed.

Figure 8:
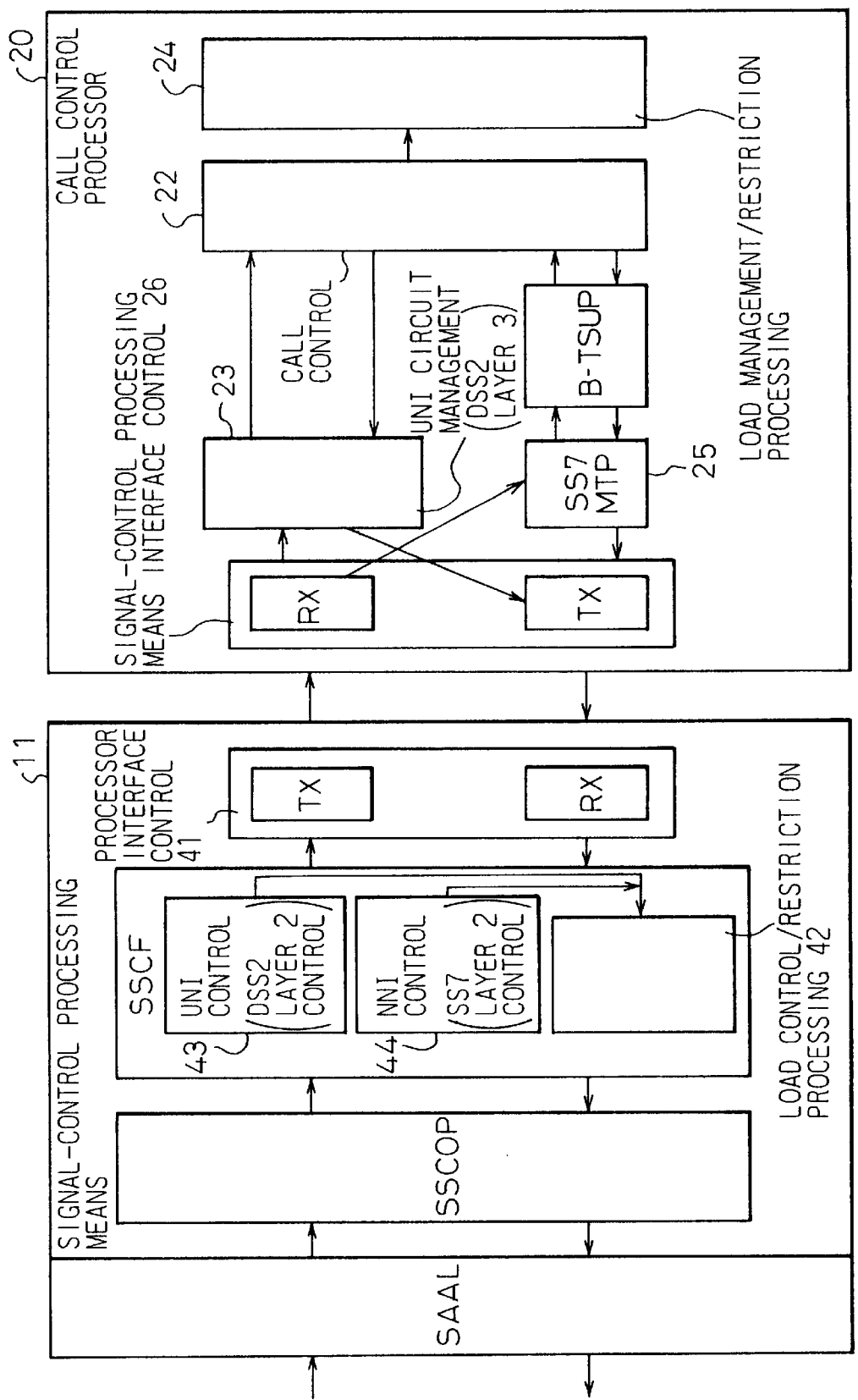
FIG. 8 is a functional block diagram based on the protocol layers of a signal-processing means and a call control processor.

FIG. 8 shows the content of FIG. 7, expressed as a functional block diagram based on the protocol layers of the signal-control processing means 11 and the call-control processor 20.

In FIG. 7 and FIG. 8, the call-control processor 20 comprises a call-control function 22 which performs call control, a DSS2 layer 3 function 23 which performs subscriber-side signal control, a control function 24 which performs load control and restriction control, an SS7MTP/B-ISUP control function 25 which performs signal control between stations, and a interface control function 26 which performs control of the interface with the signal-control processing means 11. The signal-control processing means 11 comprises a processor interface control function 41, a load-control/restriction-processing function 42, a DSS2 layer 2 control function 43 which performs signal control for each physical circuit individually, an SS7 layer 2 control function 44 which performs signal control between stations, and an additional processing function 45 which, for example, can be data collection or the like.

Figure 9A:
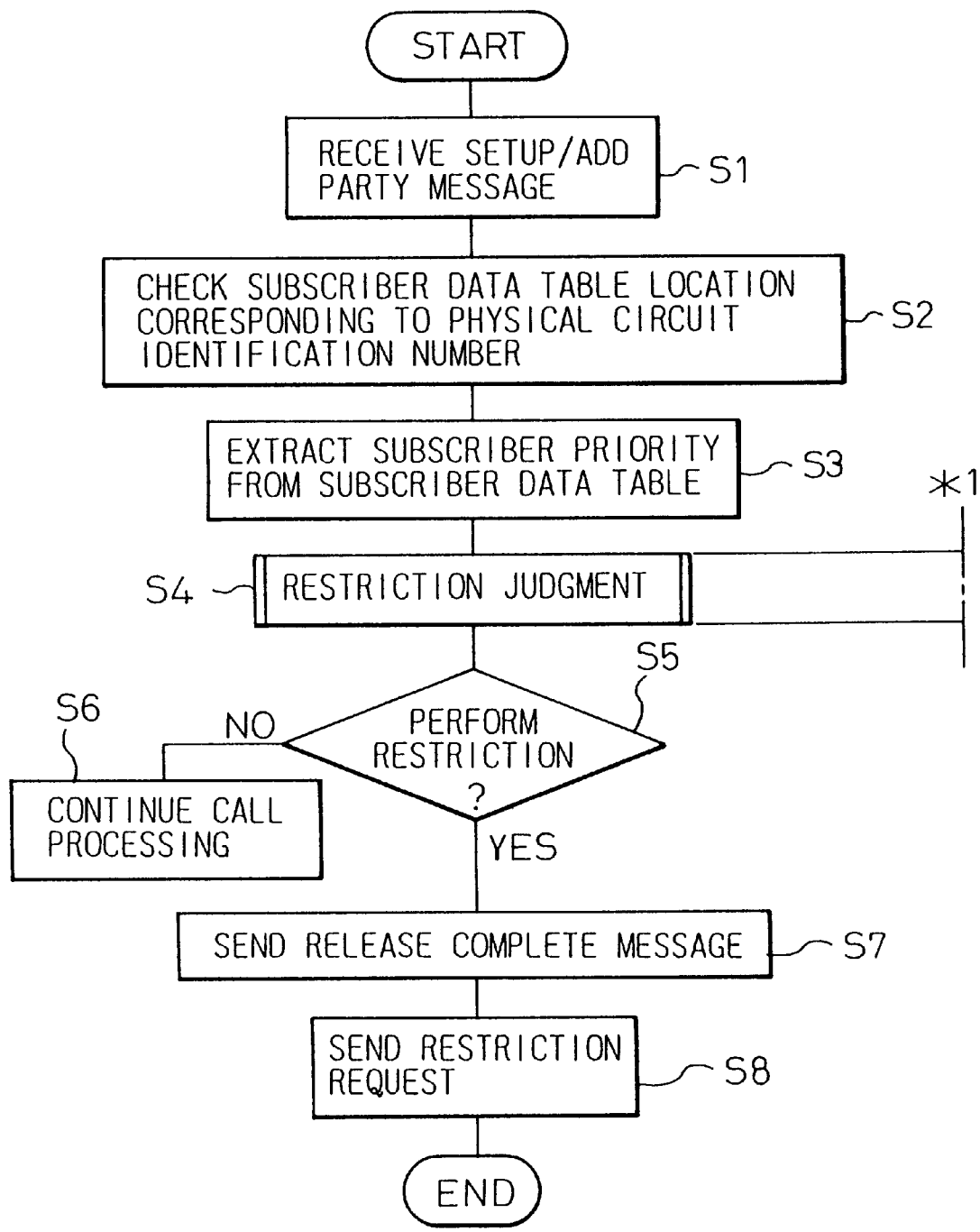
FIGS. 9A and 9B are a flowchart which shows an example of the restriction judging operation of a call control processor.
Figure 9B:
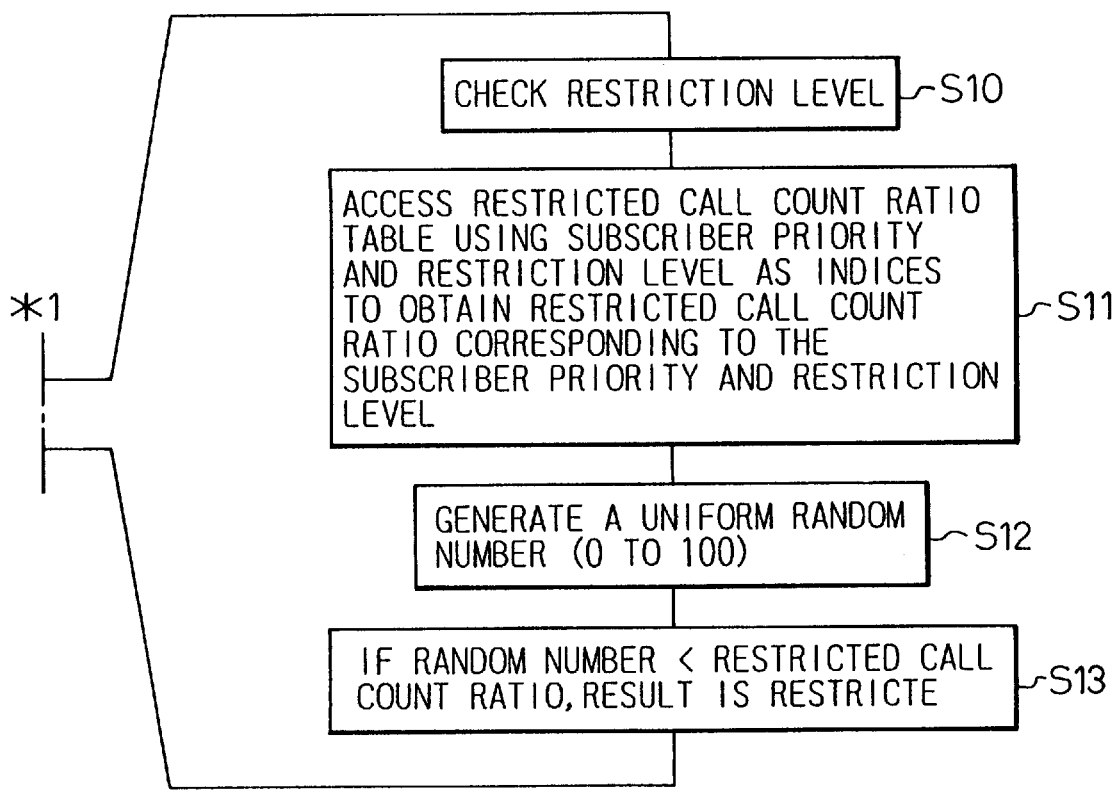

FIGS. 9A and 9B are a flowchart which shows an example of the restriction judgment operation of the call-control processor 20. The conditions for performing this operation are as follows.

<1> This restriction judgment operation is performed individually for each physical circuit. A physical circuit identification number is assigned for each physical circuit individually, and stored within the call-control processor 20.

<2> Within the call-control processor 20 is provided a subscriber data table, which includes such information as subscriber priorities.

<3> Each subscriber has a single physical circuit.

<4> Each of the physical circuits 1 has assigned to it a priority, with all of the physical circuits 1 being divided into five groups having priorities ranging from 0 to 4.

<5> Restriction is performed with a restriction ratio with respect to different priority groups.

<6> A restriction count ratio table into which is stored these restriction ratios is provided within the call-control processor 20.

<7> Five restriction ratios are defined, corresponding to the restriction levels (0 to 4) with respect to one priority.

In the case in which the ATM exchange is in the normal load condition, when the call-control processor 20 receives either a Setup message or an Add Party message from the signal-control processing means 11 (S1), a check is made of the subscriber table which corresponds to the number, based on the number of the physical circuit (S2). Next, the call-control processor 20 extracts the user priority from the subscriber data table (S3). Then a judgment is made, according to a prescribed algorithm, of whether or not to perform call restriction with respect to the physical circuit 1 which includes the virtual circuit that generated the message (S4). This judgment algorithm is in the form of a subroutine. The restriction judgment is made in accordance with the results of step S4 (S5).

By means of the judgment algorithm, if the results of the restriction judgment are that restriction is not required, the call-control processor 20 continues the call processing (S6). That is, when either a Setup message or an Add Party message is received, call setup processing is performed in accordance with a prescribed sequence.

If, however, the result of the restriction judgment is that there is a need for call restriction, a Release Complete (initialization) message is issued to the signal-control processing means 11 for the virtual circuit which called (S7), after which a call restriction request is sent (S8) to the signal-control processing means 11 for the corresponding physical circuit 1. By using this type of configuration, it is possible to perform call restriction with respect to individual physical circuits.

The above-noted restriction judgment subroutine S4 is as follows. First, a check is made of the restriction level set for the corresponding physical circuit (S10). Next, a lookup is performed of the subscriber priority from the restriction count ratio table, using the restriction level as an index, thereby obtaining the restriction count ratio corresponding to the subscriber priority and restriction level (S11). The thus-obtained restriction count ratio is defined as a percentage.

Figure 10:
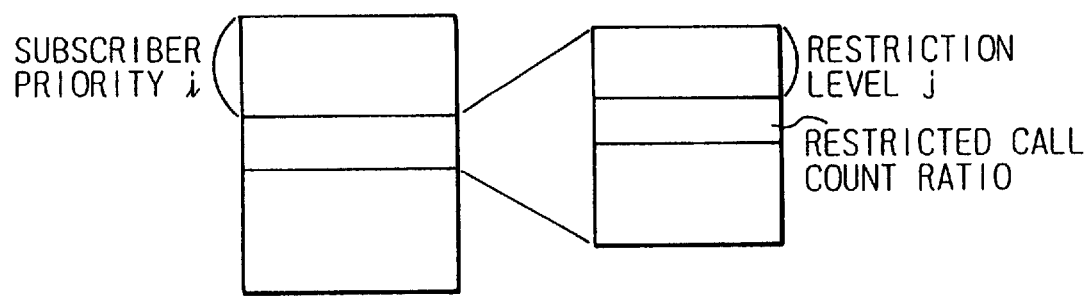
FIG. 10 is a drawing which shows an example of the configuration of a restricted number of calls ratio table.
Figures 11, 12:
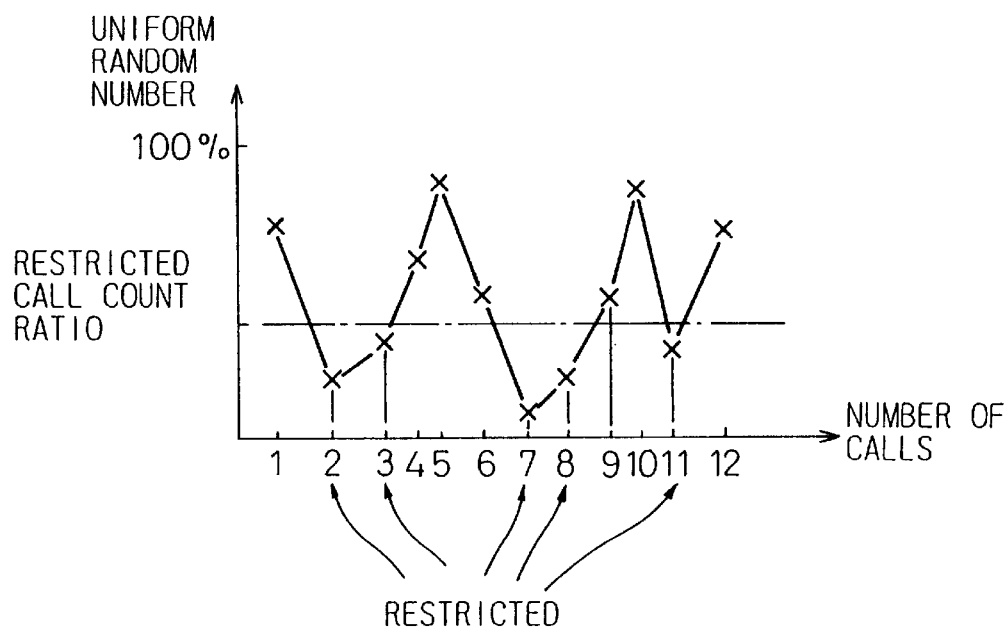
FIG. 11 is a drawing which shows a specific example of a restricted number of calls ratio table.
FIG. 12 is a drawing used to explain restriction judgment which makes use of uniform random numbers.

FIG. 10 and FIG. 11 show an example of the configuration of the restriction count ratio table, and the method of establishing the restriction count ratio will be explained with reference to these drawings. When, at step S3, the subscriber priority is established, the i-th address in the restriction count ratio table is searched. In this i-th address is stored the restriction count ratio for each of the restriction levels j. The restriction count ratio is read based on the restriction level j.

Next, the call-control processor 20 executes a uniform random number generating routine (S13), which generates a random number (0 to 100). Next, a comparison is performed between the thus-obtained random number and the restriction call count ratio obtained at step S11 (S13). In this case, if the random number is smaller than the restriction call count ratio, the judgment is to perform restriction. The reason that the random number value is in the range 0 to 100 is that it is necessary to have this range to adjust to the restriction call count ratio which is expressed as a percentage at step S11.

FIG. 12 is a drawing which illustrates a restriction judgment performed using a uniform random number. In this drawing, the vertical axis represents the uniform random numbers, and the horizontal axis represents the call count. The call count is assigned to calls in time sequence as they occur. If the points in the drawing marked X are the random numbers with respect to each of the calls, restriction is started for a call having a random number that is smaller than the determined restriction call count ratio. Note that while this drawing shows the case of a constant restriction call count ratio, the value is often different for each call.

In this manner, regulating each call individually by means of a restriction call count ratio that is established in accordance with the call restriction level, which varies in accordance with the exchange overload conditions, and in accordance with the call processing priority set for the corresponding physical circuit, it is possible to perform optimal determination of whether or not to perform call restriction for each individual call, based on the call restriction level and the restriction call count ratio.

If the signal-control processing means 11 which receives a call restriction request from the call-control processor 20 receives from the physical circuit either a Setup message or an Add Party message during a prescribed amount of time after receiving the call restriction request, it independently performs call restriction with respect to the corresponding physical circuit. By adopting this type of configuration, because the signal-control processing means 11 which receives a call restriction request from the call-control processor 20 performs call restriction independently, it is possible to reduce the load on the call-control processor 20.

While the signal-control processing means 11 performs restriction upon receiving instruction from the call-control processor 20, not only does it receive instructions from the call-control processor 20, but also when an excessive number of messages are received on individual physical circuits, it detects this condition itself and sends this information to the call-control processor 20. The call-control processor 20 receives this information and performs restriction instruction with respect to the corresponding physical circuit 1.

Figure 14A:
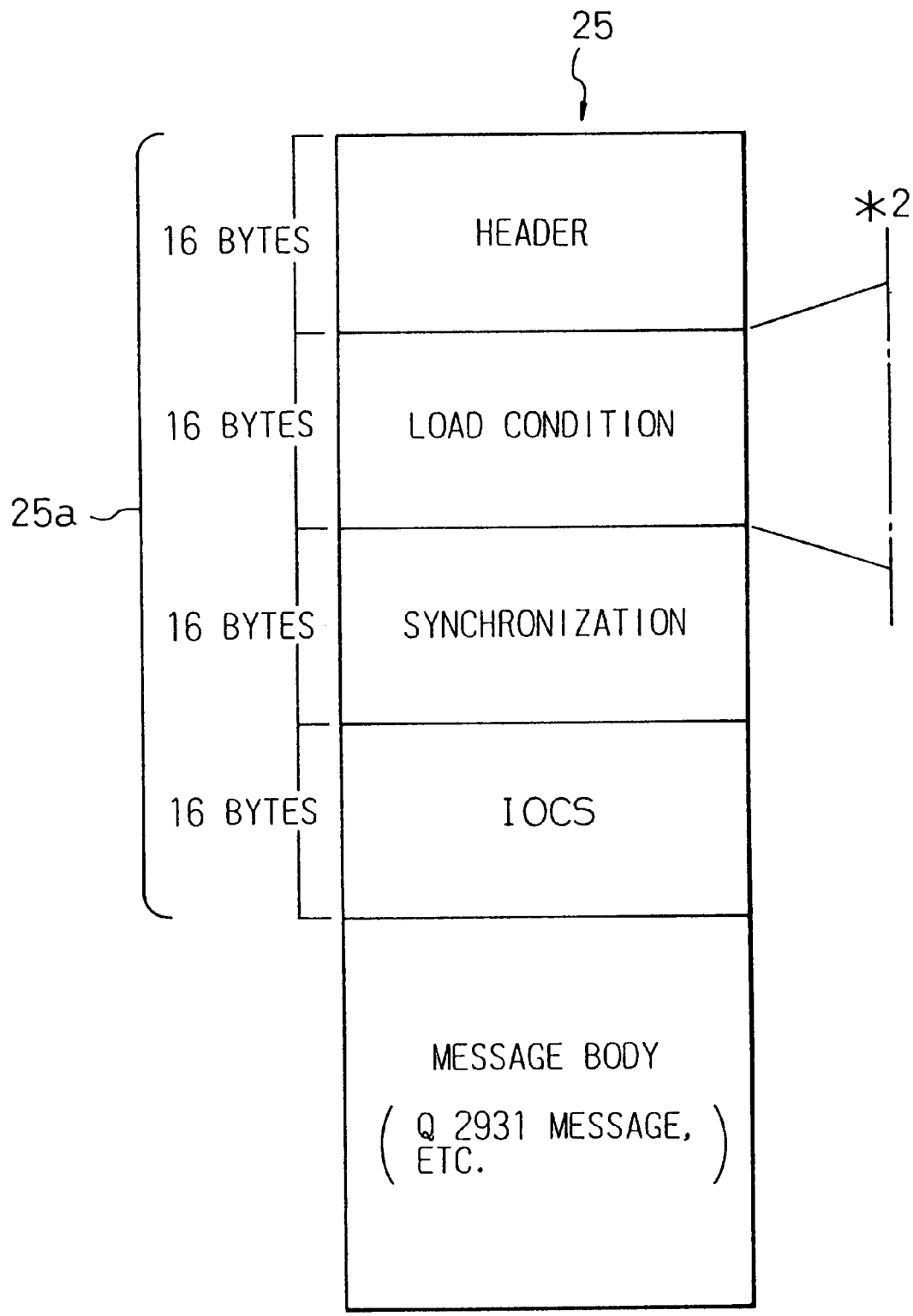
Figure 14C:
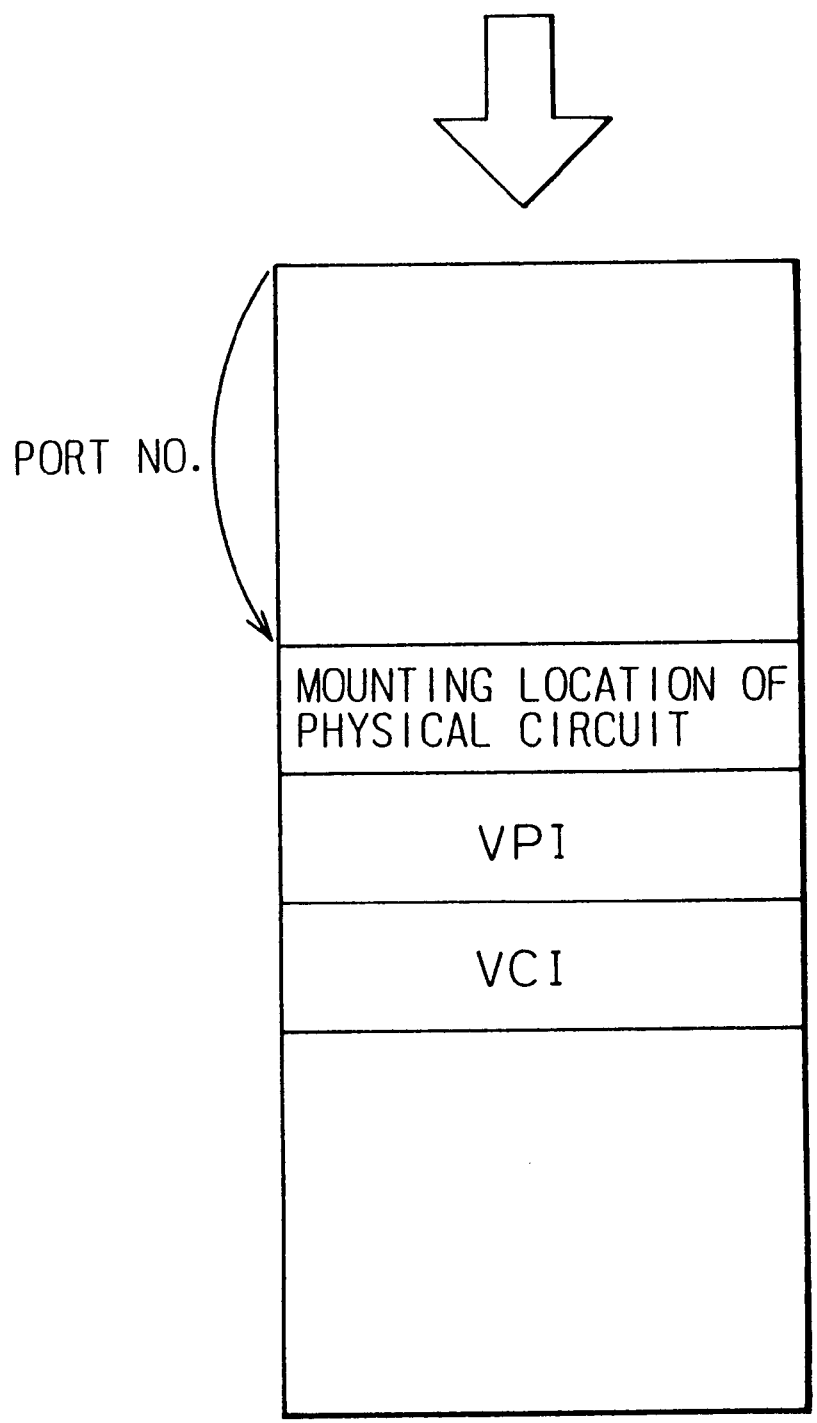

FIG. 13 is a drawing which shows the transfer of a communication message between the signal-control processing means 11 and the call-control processor 20. FIGS. 14A to 14C show the format of the message of FIG. 13.

In FIG. 13, the reference numeral 25 denotes a communication message to be transferred, and 25a is a header of the communication message 25. In the case in which there is an excessive number of received messages, the signal-control processing means 11 sets the bit corresponding to the problem physical circuit to 1 and sends this to the call-control processor 20. At the call-control processor 20, in addition to the physical circuit with excessive messages notified by the signal-control processing means 11, when an instruction is given for a physical circuit which is to be restricted is issued in response to the results of the judgment made as shown in FIGS. 9A and 9B, a bit position in the header within the communication message to be returned to the signal-control processing means 11 is set to 1.

As shown in FIGS. 14A and 14B, because there are many physical circuits 1 which are managed by the signal-control processing means 11, reports from the signal-control processing means 11 to the call-control processor 20 and instructions to restrict from the call-control processor 20 to the signal-control processing means 11 make use of the header of the communication message, and the setting of the headers of all messages transferred between the signal-control processing means 11 and the call-control processor 20 enables high-speed reports and requests. In this case, a single report is send with respect to a plurality of physical circuits or all physical circuits (in this example, as shown in FIG. 14B, the notification numbers 0 through 15 are used, so that 16 cycles are required for notification with respect to all physical circuits.

As shown in FIGS. 14B and 14C, using the port numbers which correspond to each of the physical circuits (port #0 through #63 X notification layers 0 through 15=1024 ports), one bit is allocated to each of the physical circuit, with the values having the following meanings.

<1> Report to the call-control processor 20 from the signal-control processing means 11

0/1=excessive/not excessive number of received messages

<2> Request to signal-control processing means 11 from the call-control processor 20

0/1=Call restriction request/no request

The report to the call-control processor 20 from the signal-control processing means 11 is normally made continuously during a period in which a condition of excessive received messages continues on a physical circuit 1. The call-control processor 20 receives this report and returns this value to the signal-control processing means 11 as a restriction request, and if the result of the restriction judgment by the local processor is that a given physical circuit is to be restricted, the bit corresponding to that physical circuit is set to 1, and this being sent together with the physical circuit for which the restriction request was made.

While the signal-control processing means 11 performs processing in accordance with the restriction request from the call-control processor 20, the contents reported to from the signal-control processing means 11 to the call-control processor 20 are only the physical circuit within the local signal-control processing means on which an excessive number of received message was detected, there being no return from the call-control processor 20 with regard to the physical circuit for which the request was received. For this reason, the restriction within the signal-control processing means 11 in accordance with the restriction judgment results within the call-control processor 20 is not continued unless the call-control processor 20 continues to make this setting.

FIG. 13 shows the transfer of communication messages between the signal-control processing means 11 and the call-control processor 20. In this drawing, the reference numeral 25 denotes a communication message to be transferred, and 25a is a header of the communication message 25. In the case in which there is an excessive number of received messages, the signal-control processing means 11 sets the bit corresponding to the problem physical circuit to 1 and sends this to the call-control processor 20. At the call-control processor 20, in addition to the physical circuit with excessive messages notified by the signal-control processing means 11, when an instruction is given for a physical circuit which is to be restricted is issued in response to the results of the judgment made as shown in FIGS. 9A and 9B, a bit position in the header within the communication message to be returned to the signal-control processing means 11 is set to 1.

Figure 15:
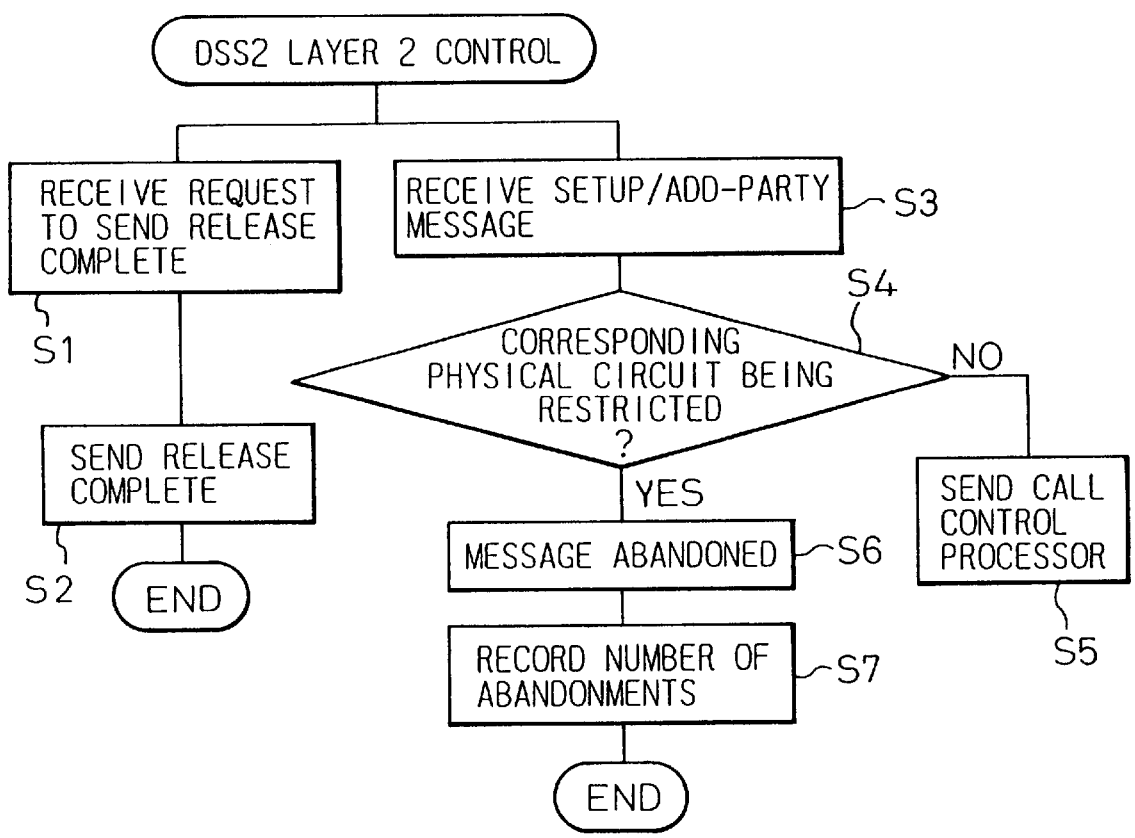
FIG. 15 is a flowchart which shows an example of the operation of a signal-control processing means.

FIG. 15 is a flowchart which shows an example of the operation of the signal-control processing means 11, which shows the control processing to abandon a Setup message or Add Party message. This control is performed by means of the DSS2 layer 2 control function (43 in FIG. 7) located within the signal-control processing means. First, when the signal-control processing means 11 receives a Release Complete transmission request from the call-control processor 20 (S1), a Release Complete message is sent with respect to the subscriber (S2).

When a Setup message or Add Party message is received from a subscriber (S3), a check is made as to whether the corresponding physical circuit is currently subject to restriction (S4). A table which indicates for each physical circuit whether or not restriction is being applied is provided within the signal-control processing means 11, and by referencing this table it is possible to make a judgment as to whether or not each individual physical circuit is subject to restriction.

In the case in which the corresponding physical circuit is not being restricted, the message is sent to the call-control processor 20 (S5). If, however, the physical circuit is being restricted, this message is abandoned (S6), and the number of abandonments is recorded (S7). In this embodiment, in the case in which the corresponding physical circuit is being restricted, the signal-control processing means 11 abandons the Setup message or the Add Party message, thereby enabling it to perform independent call restriction.

Figure 16:
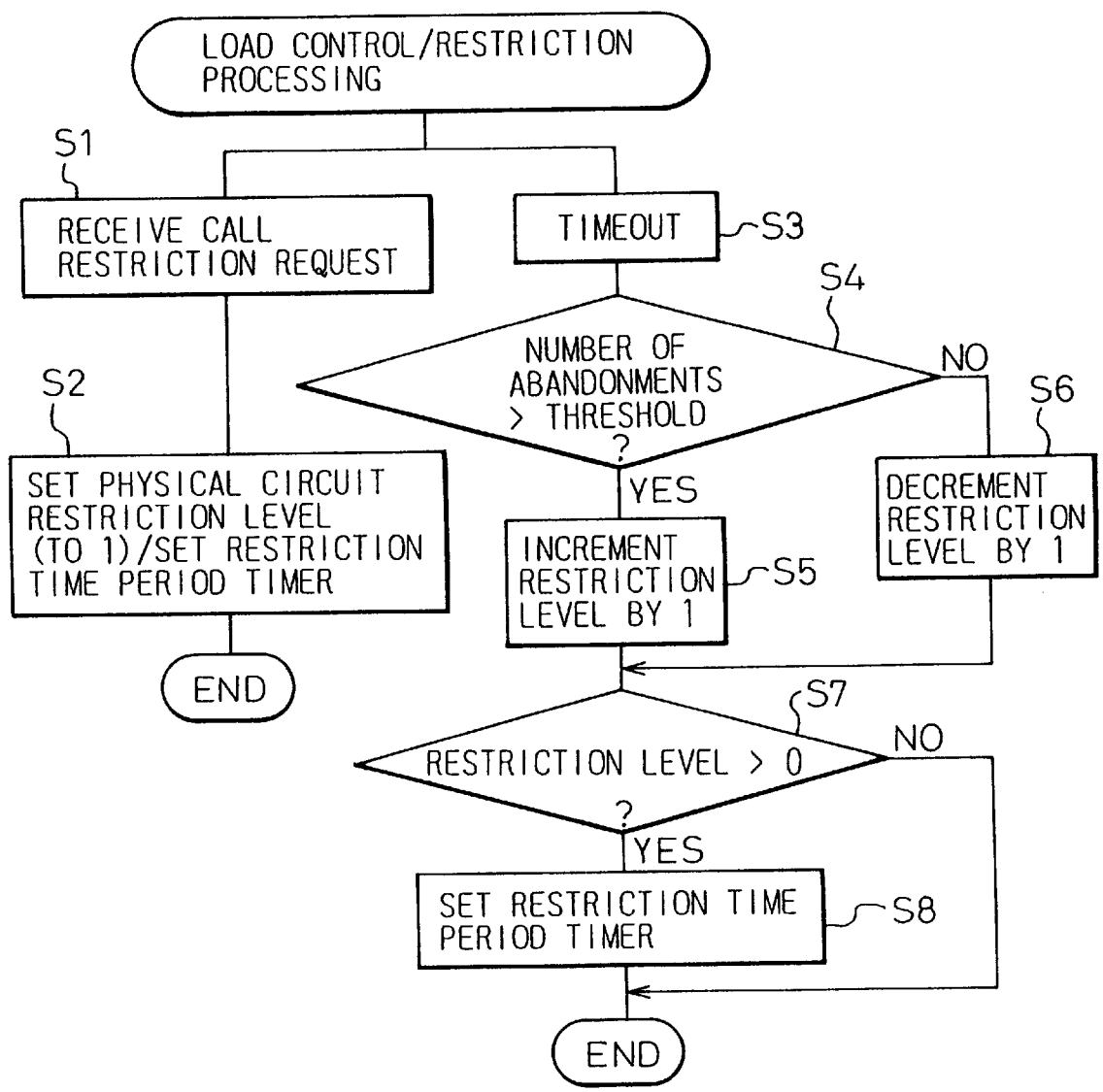
FIG. 16 is a flowchart which shows another example of the operation of a signal-control processing means.

FIG. 16 is a flowchart which shows another example of the operation of the signal-control processing means 11, this showing the load control/restriction processing operation. This control is performed by the load-control/restriction processing function contained within the signal-control processing means (42 in FIG. 7). First, if a restriction request is received from the call-control processor 20 (S1), in addition to setting the restriction level of the corresponding physical circuit, a restriction time period timer is set (S2). As previously described, the restriction level is one of five levels, from 0 to 4. The level of 0 indicates the condition in which restriction is not performed. Therefore, when the first restriction request is received, the restriction level would be set to 1.

At this point, if the restriction time period timer set at step S2 times out (S3), a comparison is performed between the stored number of abandonments and the threshold value provided for each restriction level (S4). In the case in which the number of abandonments exceeds the threshold value, because restriction is not required, the restriction level is incremented by 1 (S5). If, however, the number of abandonments does not exceed the threshold value, because this is the condition of excessive restriction, the restriction level is decremented by 1 (S6). Then, the restriction level is compared with zero (S7). In the case in which the restriction level exceeds zero, the restriction time period timer is reset at that restriction level (S8). If, however, the restriction level has reached zero, there is a return to normal operation, without resetting the restriction time period timer.

Figure 17:
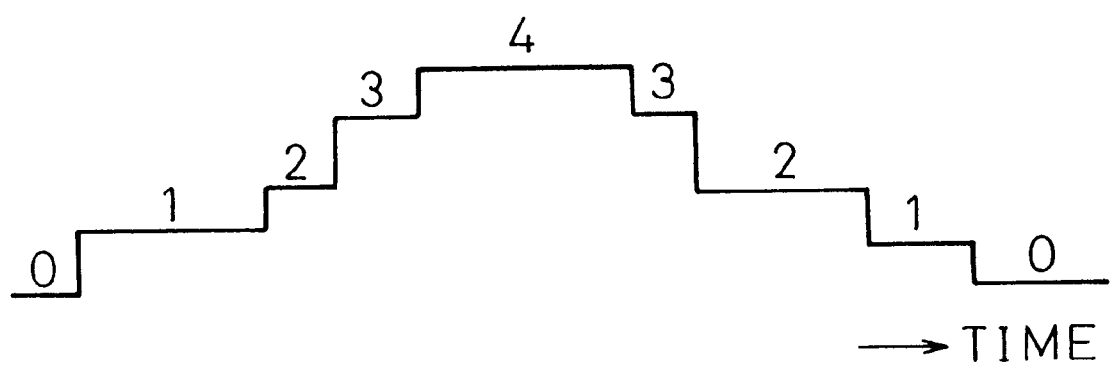
FIG. 17 is a drawing which shows the manner in which the restriction level varies.

FIG. 17 is a drawing which shows the manner in which the restriction level varies. At first, the restriction level is 0 which represents the condition of no restriction. If the number of calls increases, the call-control processor 20 performs call restriction, so that the restriction level becomes 1. Thereafter, the restriction level gradually increases, until it reaches the maximum restriction level of 4. After that, along with a decrease in the number of calls, the restriction level progressive decreases, returning to 0. When the restriction level reaches 0, the signal-control processing means 11 notifies the call-control processor 20 of all Setup messages or Add Party messages from virtual circuits within the physical circuit 1. In this case, in a ATM exchange, because there is a plurality of virtual circuits for one physical circuit 1 as shown in FIG. 4, by means of the first call restriction request from the call-control processor 20 with respect to the signal-control processing means 11, it is possible to restrict transmission for all virtual circuits within the corresponding physical circuit 1.

However, of the messages from virtual circuits of a physical circuit which are being restricted, the messages that the signal-control processing means 11 abandons without passing to the call-control processor 20 are only the Setup messages and the Add Party messages; other messages are passed to the call-control processor 20, and are processed as normal. Therefore, even for virtual circuits of a physical circuit that is being restricted, processing for already connected circuits will be performed normally. In accordance with the present invention, because the number of abandonments with respect to an abnormal subscriber which ignores the restriction instruction and repeatedly calls is large, so that the restriction level always is incremented by 1 to the next upper level, it ultimately is fixed at the restriction level of 4, so that regardless of how long it waits, calling is not permitted.

According to this embodiment, the signal-control processing means 11 performs a comparison between the number of call abandonments and a threshold value which is provided individually for each restriction level, incrementing the restriction level if the number of abandonments exceeds the threshold level and decrementing the restriction level if the number of abandonments does not exceed the threshold value, thereby enabling a step-wise variation of the degree of restriction in response to the degree of load, this further enabling efficient call restriction.

Additionally, according to this embodiment, because return is made to the normal condition if the restriction level becomes 0, it is possible to restore the normal processing condition quickly when there is no longer a need to perform call restriction.

Figure 18:
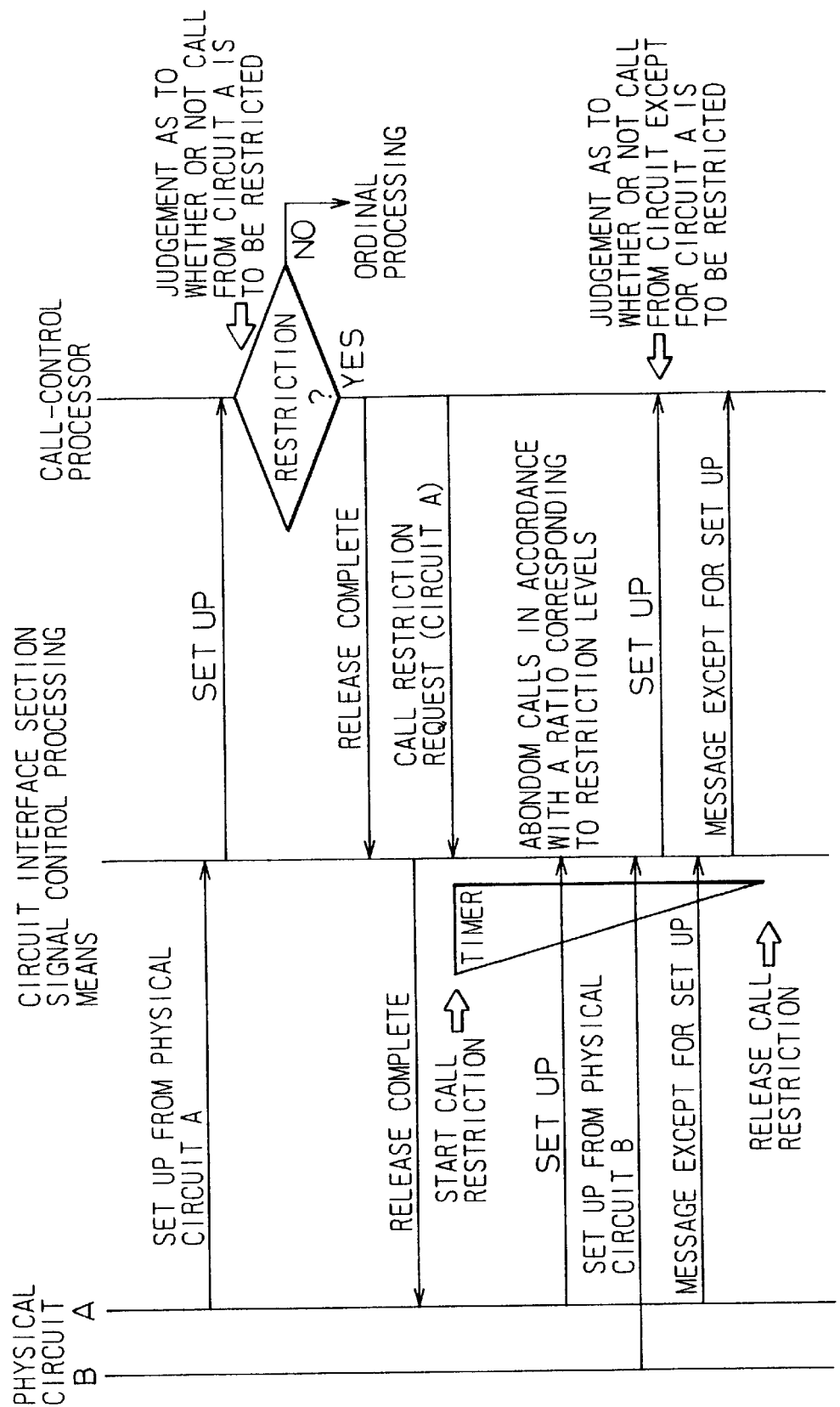
FIG. 18 is sequence diagram which shows an example of the operation of the present invention.

FIG. 18 is a sequence diagram which shows an example of the operation of the present invention. For this embodiment, it shows the transfer between two physical circuits, A and B, the signal-control processing means 11, and the call-control processor 20. If a Setup message is generated from the physical circuit A, this message is input to the circuit interface section 10. At the circuit interface section 10, the signal-control processing means 11 sends this as is to the call-control processor 20.

The call-control processor 20, which receives this Setup message, makes a judgment as to whether or not to perform restriction with respect to physical circuit A. The detailed operation involved in this judgment is as was described in relation to FIGS. 9A through 12. If the result is that restriction is not to be applied, normal operation results. If, however, restriction is to be performed with respect to this physical circuit A, the call-control processor 20 sends a Release Complete message to the circuit interface section 10. Upon receiving this message, the circuit interface section 10 sends a Release Complete message to the physical circuit A, to invoke initialization. Next, the call-control processor 20 sends a call restriction request to the circuit interface section 10.

Upon receiving this call restriction request, at the circuit interface section 10 the signal-control processing means 11 sets the restriction level of the corresponding physical circuit, and starts the restriction time period timer. During the period of restriction, even if it receives a Setup message or an Add Party message, the signal-control processing means 11 will abandon the message.

If during this period of time a Setup message is issued from the physical circuit B, notification of this message is made to the call-control processor 20 via the circuit interface section 10. The circuit interface section 10 performs processing to judge whether or not to perform call restriction in addition to that of physical circuit A. In the case in which a message other than a Setup message is issued by the physical circuit A, even if the signal-control processing means 11 is performing restriction, this message will not be abandoned, notification thereof being made to the call-control processor 20. During this time period, the restriction time period timer is released to enable acceptance of a Setup message or an Add Party message from the physical circuit A. Restriction with respect to an abnormal subscriber making a call request is continued.

By dividing the bandwidth for each physical circuit, it is possible for a subscriber to set a plurality of virtual circuits for a single physical circuit. In a non-ATM switching station, and particularly in the case of analog circuits, even if restriction is performed in units of physical circuits, a load limitation effect is not obtained. However, in an ATM exchange, because it is possible, for example, to establish 4096 virtual circuits for each single physical circuit, the effect is large.

The period of time set on the above-noted restriction time period timer by the signal-control processing means 11 is, for example, approximately 4 seconds. In this case, when abandoning a Setup message or an Add Party message during restriction, the signal-control processing means 11 sends a Release Complete message to the party, in which case an identification bit is added to indicate the exchange overload. For this reason, a subscriber which receives a Release Complete message can recognize that the exchange is overloaded, and can thereby suppress calling. That is, the subscriber can recognize that call restriction is being performed, thereby preventing needless calling.

However, for a subscriber which ignores the request from the exchange and makes an abnormal call during this 4-second period, abandonment processing will be performed, with normal processing being performed with respect to other subscribers. Therefore, it is possible to prevent interference to a large number of connection processes by just some abnormal callers. That is, only the physical circuit on which an abnormal call is being performed is removed from service, thereby enabling a reduction in the disturbance to other physical circuits.

As described in detail above, according to the present invention, in an ATM exchange which has at least one circuit interface section to which are connected a plurality of physical circuits and which terminates the circuits, and a call control processor which is connected to the circuit interface section or sections and which performs call-processing control, by providing within the above-noted circuit interface section a signal-control processing means which, either by means of an instruction from the above-noted call-processing controller or independently, performs call restriction, when the signal-control processing means receives a call restriction request from the call control processor, in response to the request or independently, call restriction is performed with respect to a physical circuit 1. According to the present invention, it is possible to reduce the load on the call control processor, and also possible to step-wise vary the degree of call restriction in response to the degree of load.

In this case, because the above-noted signal-control processing means performs call restriction with respect to individual physical circuits of the physical circuit which are connected to the circuit interface section, excess call restriction is eliminated.

When the above-noted call control processor receives either a Setup message or an Add Party message from a subscriber, it determines, according to a prescribed algorithm, whether or not to perform call restriction with respect to the physical circuit which includes the virtual circuit which generated the message, and if the result is that call restriction is to be performed, it issues an instruction so that a Release Complete message is returned to the signal-control processing means, after which, by sending a call restriction request to the same signal-control processing means 11, it is possible to perform call restriction with respect to each physical circuit individually.

The above-noted prescribed algorithm is performed for each call, in accordance with a restricted call count ratio, which is established by the call restriction level, which varies in accordance with the load condition of the exchange and by the call processing priority which is set for the above-noted physical circuit, enabling an optimal establishment of whether or not to perform call restriction, based on the degree of call restriction and the restricted call count ratio.

In addition, according to the present invention, if the signal-processing control means 11 which has received a call restriction request from the above-noted call control processor receives either a Setup message or an Add Party message within a prescribed period of time after it receives the above-noted call restriction request, it independently performs call restriction processing with respect to the corresponding physical circuit, and because the signal-control processing means performs this call restriction independently upon receipt of a call restriction request from the call control processor, it is possible to reduce the load on the call control processor.

If the above-noted signal-control processing means receives a Setup message or an Add Party message, it checks whether or not the corresponding physical circuit is currently subject to restriction, and if it is currently not subject to restriction the corresponding message is sent to the call control processor. However, if it is currently subject to restriction, the corresponding message is abandoned, and the number of abandonments is recorded, so that by having the signal-control processing means abandon a Setup message or a Add Party message during call restriction, it is possible to perform call restriction independently.

If the above-noted signal-control processing means receives a call restriction request from the call control processor, simultaneously with setting the restriction level of the corresponding physical circuit, it sets (starts) the restriction time period timer, and if this timer times out, a comparison is made between the number of abandoned calls and the threshold value provided for each of the restriction levels, incrementing the restriction level by one if the number of abandoned calls exceeds the threshold level, decrementing the restriction level by one if the threshold level is not exceeded, and resetting the restriction time period timer. By doing this, the signal-control processing means compares the number of abandoned calls with a threshold value that is set for each individual restriction level, increasing the restriction level by 1 if the threshold value is exceeded by the number of abandonments and decreasing the restriction level by 1 if the threshold is not exceeded, thereby enabling a step-wise variation in the degree of call restriction in response to the degree of load, as well as efficient call restriction.

When the restriction level becomes 0, the signal-control processing means returns to the normal processing condition, so that return is made quickly to the normal processing condition when there is no longer a need to perform call restriction.

In addition, when the signal-control processing means receives either a Setup message or a Add Party message and abandons this message, an identification code which indicates that the exchange is overloaded is applied to a Release Complete message which it sends, thereby enabling recognition at the subscriber of the fact that call restriction is being performed, so that unnecessary calling is prevented.

According to the present invention, when an ATM exchange is overloaded, by performing call restriction processing at the signal-control processing means of the circuit interface section, it is possible to suppress an increase in the load on the call control processor by performing this call restriction processing. In an ATM exchange, because a single physical circuit includes a plurality of virtual circuits, even if call restriction is performed with respect to physical circuits, call restriction is performed with respect to a plurality of virtual circuits, making it possible to obtain a sufficient load-reducing effect. In addition, because restriction is performed with respect to individual physical circuits, excessive restriction is avoided, enabling enhanced step-wise controlled restriction.

In the above-described manner, the present invention provides a call restriction for an ATM exchange which is capable of reducing the load on the call control processor, and of achieving a step-wise variation in the degree of call restriction in response to the degree of load.

What is claimed is:

1. In an ATM exchange which has at least one circuit interface section to which are connected a plurality of physical circuits, and which terminates said physical circuits, and a call control processor which is connected to the circuit interface section or sections and which performs call-processing control, a call restriction system in said circuit interface section comprising:

means for signal-control processing which performs call restriction either by an instruction from said call control processor or independently, and wherein said call control processor determines by means of a prescribed algorithm, whether or not call restriction is to be performed with respect to a physical circuit which contains a virtual circuit originating a message, and said signal-control processing means independently perform call restriction for a predetermined time with respect to said physical circuit after receiving a call restriction request in accordance with said determination by said call control processor.

2. A call restriction system according to claim 1, wherein when said call control processor receives either a Setup message or an Add Party message from a subscriber, a determination is made, by means of a prescribed algorithm, as to whether or not call restriction is to be performed with respect to a physical circuit which contains a virtual circuit which generated said message, and if said call restriction is to be performed, said signal-control processing means is directed to send a Release Complete message to said virtual circuit, and thereafter a call restriction request is sent to the same said signal-control processing means.

3. A call restriction system according to claim 2, wherein said prescribed algorithm is performed for every call by means of a restricted call count ratio which is established in accordance with a call restriction level that varies in response to a load condition of the exchange, and in accordance with a call processing priority which is set for said physical circuit.

4. A call restriction system according to claim 2, wherein when said signal-control processing means which has received a call restriction request from said call control processor receives either a Setup message or an Add Party message from a physical circuit after receiving said call restriction request, said signal-control processing means independently performs call restriction processing with respect to said physical circuit.

5. A call restriction system according to claim 4, wherein if said signal-control processing means receives either a Setup message or an Add Party message, said signal-control processing means performs a check of whether or not said physical circuit is subject to restriction and if said physical circuit is not being restricted said signal-control processing means send said message to said call control processor, but if said physical circuit is being restricted, said signal-control processing means abandons said message and records the number of abandonments.

6. A call restriction system according to claim 4, wherein if said signal-control processing means receives a call restriction request from said call control processor, simultaneous with setting a control level for said physical circuit, said signal-control processing means sets a restriction time period timer, and if said timer times out, performs a comparison between the number of abandonments and a threshold value which is set for each restriction level, incrementing the restriction level by 1 if the number of abandonments exceeds said threshold value, decrementing said threshold value is the number of abandonment does not exceed said threshold value, and setting said restriction time period timer once again.

7. A call restriction system according to claim 6, wherein if the restriction level becomes 0, said signal-control processing means returns to the normal condition.

8. A call restriction system according to claim 5, wherein when said signal-control processing means receives either a Setup message or a Add Party message and abandons said message, it adds an identifier code, which indicates to said subscriber that the ATM exchange is overloaded, to a Release Complete message which it sends.

* * * * *